United States Patent
Jo et al.

(10) Patent No.: US 11,821,752 B2
(45) Date of Patent: Nov. 21, 2023

(54) METHOD FOR LOCALIZING AND ENHANCING A DIGITAL MAP BY A MOTOR VEHICLE; LOCALIZATION DEVICE

(71) Applicant: Valeo Schalter und Sensoren GmbH, Bietigheim-Bissingen (DE)

(72) Inventors: Kichun Jo, Bobigny (FR); Paulo Resende, Bobigny (FR); Benazouz Bradai, Bobigny (FR); Myoungho Sunwoo, Bobigny (FR); Sungjin Cho, Bobigny (FR); Chansoo Kim, Bobigny (FR)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 182 days.

(21) Appl. No.: 16/650,659

(22) PCT Filed: Sep. 25, 2018

(86) PCT No.: PCT/EP2018/075864
§ 371 (c)(1),
(2) Date: Mar. 25, 2020

(87) PCT Pub. No.: WO2019/063506
PCT Pub. Date: Apr. 4, 2019

(65) Prior Publication Data
US 2020/0318977 A1    Oct. 8, 2020

(30) Foreign Application Priority Data
Sep. 27, 2017   (DE) ..................... 10 2017 122 440.8

(51) Int. Cl.
*G01C 21/00*   (2006.01)
*G01C 7/04*   (2006.01)
(Continued)

(52) U.S. Cl.
CPC .......... *G01C 21/3881* (2020.08); *G01C 7/04* (2013.01); *G01S 13/89* (2013.01); *G01S 15/89* (2013.01); *G01S 17/89* (2013.01)

(58) Field of Classification Search
CPC .......... G01C 21/32; G01C 7/04; G01S 13/89; G01S 15/89; G01S 17/89; G01S 13/42; G01S 13/931
See application file for complete search history.

(56) References Cited

U.S. PATENT DOCUMENTS 10,151,588 B1 * 12/2018 Singh ...................... G01S 17/86
2006/0271281 A1 * 11/2006 Ahn ....................... G01C 21/26
701/532
(Continued)

FOREIGN PATENT DOCUMENTS

DE          698 23 462 T2    4/2005
DE     10 2010 011 629 A1    1/2011
(Continued)

OTHER PUBLICATIONS

German Search Report in corresponding German Application No. 10 2017 122 440.8, dated Jun. 21, 2018 (7 pages).
(Continued)

*Primary Examiner* — Mahmoud S Ismail
(74) *Attorney, Agent, or Firm* — Osha Bergman Watanabe & Burton LLP

(57) ABSTRACT

The invention relates to a method for localizing and enhancing a digital map through a motor vehicle. The method includes receiving a digital partial map representing an environment of the motor vehicle and capturing an image of the environment of the motor vehicle by a sensor arrangement of the motor vehicle. The motor vehicle is localized in the environment by comparing the received digital partial map with the image of the environment of the motor vehicle. The digital partial map is enhanced on the basis of the image
(Continued)

Figure 1:
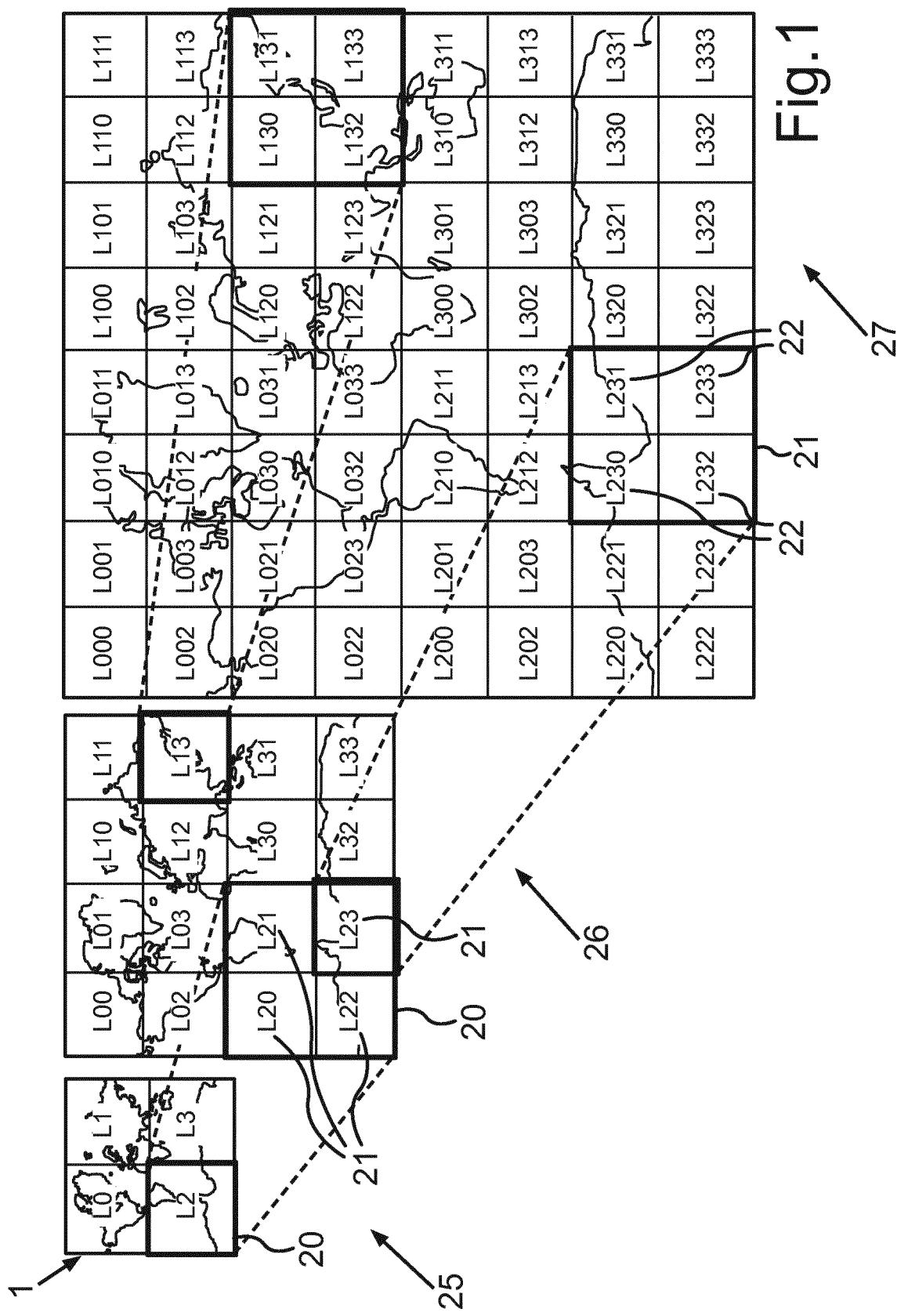

of the environment, and the enhanced digital partial map and/or the image of the environment (U) is transmitted to a database for enhancing the digital map.

12 Claims, 4 Drawing Sheets

(51) Int. Cl.
  *G01S 13/89* (2006.01)
  *G01S 15/89* (2006.01)
  *G01S 17/89* (2020.01)

(56) References Cited

U.S. PATENT DOCUMENTS

| | | | | |
|---|---|---|---|---|
| 2007/0250264 | A1* | 10/2007 | Sekine | G01C 21/3446 701/428 |
| 2010/0076920 | A1* | 3/2010 | Johnson | G01V 11/00 706/52 |
| 2010/0292913 | A1* | 11/2010 | Walkling | G09B 29/106 701/532 |
| 2011/0010131 | A1* | 1/2011 | Miyajima | B60T 17/221 702/181 |
| 2012/0075812 | A1* | 3/2012 | Hable | H01L 24/24 361/728 |
| 2013/0241953 | A1* | 9/2013 | Futatsugi | G09B 29/007 345/629 |
| 2014/0005933 | A1 | 1/2014 | Fong et al. | |
| 2017/0122749 | A1* | 5/2017 | Urano | G01C 21/30 |
| 2017/0248963 | A1 | 8/2017 | Levinson et al. | |
| 2017/0261995 | A1* | 9/2017 | Heimberger | G06T 7/70 |
| 2017/0344018 | A1* | 11/2017 | Song | G05D 1/0274 |
| 2018/0075643 | A1* | 3/2018 | Sequeira | G06T 15/08 |
| 2018/0216942 | A1* | 8/2018 | Wang | G01S 17/89 |
| 2018/0224294 | A1* | 8/2018 | Hao | G01C 21/3492 |
| 2018/0300561 | A1* | 10/2018 | Steyer | G01S 13/931 |
| 2019/0186927 | A1* | 6/2019 | Koponen | G01C 21/30 |
| 2019/0187274 | A1* | 6/2019 | Kami | G01S 13/08 |
| 2020/0098135 | A1* | 3/2020 | Ganjineh | G06T 7/74 |
| 2020/0209401 | A1* | 7/2020 | Motoyama | G01S 17/931 |

FOREIGN PATENT DOCUMENTS

| | | |
|---|---|---|
| DE | 10 2010 006 828 A1 | 8/2011 |
| DE | 10 2011 113016 A1 | 3/2012 |
| DE | 10 2014 210 770 A1 | 12/2015 |
| DE | 10 2014 220 687 A1 | 4/2016 |
| EP | 3290952 A1 | 3/2018 |
| WO | WO-2021191683 A1 * | 9/2021 |

OTHER PUBLICATIONS

International Search Report and Written Opinion in corresponding International Application No. PCT/EP2018/075864, dated Jan. 7, 2019 (8 pages).

* cited by examiner

METHOD FOR LOCALIZING AND ENHANCING A DIGITAL MAP BY A MOTOR VEHICLE; LOCALIZATION DEVICE

The invention relates to a method for localizing and enhancing a digital map through a motor vehicle. The invention moreover relates to a motor vehicle localization device.

Autonomous motor vehicles allow for a particularly comfortable, safe, and economic transport of passengers. For a safe autonomous drive an environment of the motor vehicle must be captured as precisely as possible. For instance the identification of obstacles, further traffic participants, and the roadway is necessary. Additionally, an as precise as possible localization of the motor vehicle for navigating on the basis of predetermined maps can be necessary. For this purpose autonomous motor vehicles comprise a plurality of sensors. For instance motor vehicles comprise cameras, ultrasonic sensors, and/or radar sensors for capturing the environment.

The localization of the motor vehicle can for instance be effected on the basis of a satellite signal of a global navigation satellite system. Alternatively or additionally, a localization of the motor vehicle on the basis of landmarks is possible. For instance a relative position of the motor vehicle relative to a landmark of known absolute position is captured and therefrom the pose of the motor vehicle is calculated.

It is the task of the present invention to enhance in resource-efficient way a localization of the motor vehicle on the basis of a digital map as well as the digital map simultaneously.

This task according to the invention is solved by the subject matters of the independent patent claims. Advantageous embodiments with expedient enhancements are subject matter of the subclaims. Expedient enhancements and advantages of the method according to the invention in analogy also apply to the motor vehicle localization device.

In order to allow for the localization of the motor vehicle and enhancement of the digital map simultaneously in a resource-efficient way, according to the invention the following steps are provided:
  receiving a digital partial map of a multitude of partial maps of the digital map through the motor vehicle from a data base, wherein the digital map is segmented according to a predetermined segmentation rule into the multitude of digital partial maps, and wherein the digital partial map represents an environment of the motor vehicle,
  capturing an image of the environment of the motor vehicle by means of a sensor arrangement of the motor vehicle,
  localizing the motor vehicle in the environment by comparing the received digital partial map with the image of the environment of the motor vehicle,
  enhancing the digital partial map on the basis of the image of the environment of the motor vehicle,
  transmitting the enhanced digital partial map and/or the image of the environment to the database for enhancing the digital map.

The segmentation of the digital map into the multitude of the digital partial maps is preferably effected already prior to the execution of the method steps. Thus the segmentation of the digital map into the multitude of the digital partial maps is independent of position, pose, motion, or destination of the motor vehicle. If the method additionally is performed by further motor vehicles, the segmentation of the digital map into the multitude of digital partial maps advantageously for all motor vehicles, i.e. the motor vehicle and the further motor vehicles, is identical. For instance each of the digital partial maps from the multitude of the digital partial maps represents a respective environmental region. The environmental regions are represented in particular completely and exclusively by one of the digital partial maps. Preferably the respective environmental regions of the digital partial maps each are of equal size. In other words each of the digital partial maps represents an environmental region of equal dimensions. The digital map can represent a predetermined area. For instance the digital map represents the entire world, a continent, a country, a region, or a town. Each environmental region that is represented by one of the digital partial maps can be a partial area of the area represented by the digital map. Positioning and orientation of an environmental region that is represented by one of the digital partial maps can be predetermined and/or fixed by the predetermined area.

On the basis of the image of the environment of the motor vehicle the motor vehicle is localized by comparing the received digital partial map within the environment. Simultaneously, the digital partial map is enhanced on the basis of the image of the environment. For instance the localization is effected through the identification of common features in the image of the environment and in the received digital partial map. Common features can for instance be objects, which are represented both in the image of the environment and in the digital partial map. The enhancing of the digital map can for instance be effected on the basis of identifying differences among the image of the environment of the digital partial map. Such differences can for instance be objects, which are represented either in the image of the environment or in the digital partial map. In this case it can for instance be assumed that the environment has changed. The enhancing of the digital map in this case is effected in such a way that the digital partial map is adjusted to the image of the environment. In other words an image of the object is included in the digital partial map, if it is represented in the image of the environment, or is removed from the digital partial map, if it is not represented in the image of the environment.

In preferred embodiments the localizing and/or the enhancing of the digital map is effected in the motor vehicle, for instance in a computing device of the motor vehicle. In this case the enhanced digital partial map is transmitted after the enhancing to the database. In the database the digital map can be enhanced in consideration of the digital partial map.

In other embodiments the enhancing of the digital partial map and/or the digital map can be effected in the database. The database can be comprised by a server device, wherein the enhancing of the digital partial maps is performed by the server device. For instance in this case the image of the environment for the enhancing of the digital map is transmitted to the database.

The localizing on the basis of the digital partial map as well as the enhancing of the digital partial map can be executed simultaneously by a method for "Simultaneous Localization and Mapping (SLAM)". This is in particular a problem in the field of robot technology, in which a mobile robot at the same time must create a map of its environment and estimate its pose within this map. An essential advantage of the application of such a SLAM method to the present invention in comparison with the prior art is the fact that presently position and orientation digital partial map is fixed by the predetermined segmentation rule.

One enhancement envisages that the digital partial map according to the predetermined segmentation rule is segmented by cascaded segmentation of the digital map into a predetermined number, in particular four segmental parts of equal size. In other words the digital map is segmented into the predetermined number, in particular four segmental parts. This segmentation can be repeated in segmentation levels. For instance the digital map is segmented in a first level into the predetermined number, preferably four segmental parts. The segmental parts of the first level in the second level are each segmented again into the predetermined number of segmental parts. The segmental parts of the last level can create the multitude of the digital partial maps. In other words each segmental part of the last level forms one of the multitude of the digital partial maps.

Advantageously, the area of validity of the digital partial map is fixed within a predetermined stationary reference system. In particular the area of validity of the digital partial map is fixed with regard to the area predetermined by the digital map. The area predetermined by the digital map can be fixed with regard to global coordinates, for instance longitudes and latitudes. Thereby it is ensured that the digital partial map is universally employable for different motor vehicles. For instance the digital partial map can be enhanced by a plurality of different motor vehicles. The area of validity of the digital partial map can correspond to the entire environmental region, which is represented by the digital partial map.

An enhancement envisages that the digital partial map at least partly is characterized by a grid as well as a respective occupancy indication as to grid cells of the grid. Thus, the occupancy indication can indicate which areas of the environment represented by the digital map are occupied and/or vacant. For instance by the occupancy indication it can be characterized which of the areas of the environment are vacant, which are occupied, and which areas have an ambiguous occupancy state. As occupied can be regarded areas, in which there is a foreign object, for instance a further motor vehicle, a cyclist, a pedestrian, a lane marking, or an obstacle. Generally, areas that are not driven on can be considered as occupied. As vacant can be regarded areas, on which the motor vehicle can drive, for instance areas of the roadway. In particular areas, for which it has been established that there are no foreign objects therein, can be considered to be vacant.

The occupancy indication can be given by an occupancy probability. The occupancy probability may give a probability for the grill cell to be occupied. The grid cell may be considered as occupied, if the occupancy probability is bigger than a first predetermined probability value. The grid cell may be considered as vacant, if the occupancy probability is smaller than a second predetermined probability value. The first predetermined probability value is preferably bigger than the second predetermined probability value. For an occupancy probability smaller than the first predetermined probability value but bigger than the second predetermined probability value, the grid cell may be considered as ambiguous.

An enhancement envisages that upon enhancing the digital partial map an enhanced occupancy indication is created from an occupancy indication established on the basis of an image of the environment as well as on the basis of at least one further occupancy indication, which were received as part of the digital partial map. The occupancy indication established on the basis of the image of the environment can be established from a sensor signal of the sensor arrangement. For instance the image or the sensor signal is analyzed in order to establish the occupancy indication. Areas, for which it cannot be established whether these are vacant or occupied, can be regarded as ambiguous. The further occupancy indication, which was received as part of the digital partial map, is provided by the database. Thus, it is possibly an outdated indication. The enhanced occupancy indication, by which the enhanced digital partial map is characterized at least partly, can be created from the further occupancy indication and the established occupancy indication. For instance the enhanced occupancy indication is created by updating the further occupancy indication on the basis of the established occupancy indication. Thus, the enhanced digital partial map can be enhanced by updating the received digital partial map on the basis of the image of the environment.

The enhancing of the digital partial map can for instance be effected on the basis of the evidence theory, in particular the Dempster-Shafer theory. In this connection probabilities, which characterize the digital partial map and/or the image of the environment, can be taken into consideration. For example the probabilities can characterize how likely the respective occupancy indications, in particular the established occupancy indication and the further occupancy indication, are to be correct. For instance the probability of the coincidence of the established occupancy indication can consider a signal quality or capture quality of the sensor arrangement, a quality of the localization of the motor vehicle, and/or a capture accuracy of the sensor arrangement. For instance the probability of the coincidence of the further occupancy indication can consider from which source the database has received the further occupancy indication, how the further occupancy indication is, or from how many sources the database has received the further occupancy indication. Upon enhancing the digital partial map the enhanced occupancy indication can be created in consideration of the respective probabilities of the established occupancy indication under further occupancy indication on the basis of the evidence theory, in particular the Dempster-Shafer theory.

An enhancement envisages that the digital partial map is received prior to or upon entry of the motor vehicle into the environmental region represented by the digital partial map and/or is transmitted upon leaving the environmental region represented by the digital partial map by the motor vehicle. In other words, the digital partial map cannot be received from the database until the motor vehicle is about to drive on the environmental area represented by the digital partial map. Alternatively or additionally, the enhanced digital partial map can be transmitted upon leaving the environmental region represented by the digital partial map by the motor vehicle to the database. Upon transmission of the enhanced digital partial map same can be deleted from a storage of the motor vehicle. By the receiving and/or the transmitting of the digital partial map in the mentioned way a storage consumption in the motor vehicle can be minimized.

By the sensor arrangement upon capturing the image of the environment of the motor vehicle distance values for obstacles can be measured by the sensor arrangement. In particular the sensor arrangement is configured for a distance measuring. Thus, the image of the environment can be established by measuring a plurality of distance values. In particular the sensor arrangement comprises a (also in German) so-called TOF ("time of flight") sensor. By a TOF sensor a measuring signal is emitted. This measuring signal can be reflected on an obstacle. The reflected measuring signal is received by the TOF sensor. On the basis of the time of flight of the measuring signal the distance of the obstacle can be measured. For instance the TOF sensor is configured as radar sensor, Lidar sensor, or ultrasonic sensor.

An enhancement envisages that the digital partial map is received from the database of a server device and/or the enhanced digital partial map is transmitted to the database of the server device. The receiving or transmitting of the digital partial map is effected in particular via a radio link, preferably via the mobile radio network. In other words the database is part of the server device. Thus, the motor vehicle as well as a plurality of further motor vehicles can access the database.

In particular by the server device in addition to the enhanced digital partial map from the motor vehicle another enhanced digital partial map is received from the at least one further motor vehicle and the digital map is enhanced by composing the two enhanced digital partial maps. Due to the fact that the database is stored centrally in the server device, digital partial maps enhanced by the database can be received both from the motor vehicle as well as from the at least one further motor vehicle, in particular a plurality of further motor vehicles. Thus, the digital map can be composed of the digital partial maps of multiple motor vehicles, namely the motor vehicle and the at least one further motor vehicle. In particular in each motor vehicle the digital map is enhanced on the basis of a respective digital image of the respective environment. By the server device from each of the motor vehicles a respective enhanced digital partial map can be received. Thus, the digital map is enhanced at least partly by composing the enhanced digital partial maps. By the server device respective digital partial maps can be sent to the motor vehicle and the at least one further motor vehicle. In this connection the respective digital partial maps are segmented by the same predetermined segmentation rule.

The composing of the two enhanced digital partial maps can be effected on the basis of the evidence theory, in particular the Dempster-Shafer theory. In particular, if respective enhanced partial maps from various motor vehicles represent the same environmental region, the digital map can be enhanced on the basis of probabilities, by which a precision of the enhanced partial map is characterized. For instance the enhanced digital partial maps each comprise occupancy indications relating to the respective grid cells. To each of the occupancy indications can be assigned a probability, which indicates, how likely the respective occupancy indication is to be correct. These probabilities can be taken into consideration when enhancing the digital map on the basis of the evidence theory, in particular the Dempster-Shafer theory.

A second aspect of the invention relates to a motor vehicle localization device, comprising
a receiving device for receiving a digital partial map of a multitude of partial maps of the digital map through the motor vehicle from a database, wherein the digital map according to a predetermined segmentation rule is segmented into the multitude of the digital partial maps, and wherein the digital partial map represents an environment of the motor vehicle,
a sensor arrangement for capturing an image of the environment of the motor vehicle,
a computing device for localizing the motor vehicle in the environment by comparing the received digital partial map with the image of the environment of the motor vehicle as well as for enhancing the digital partial map on the basis of the image of the environment of the motor vehicle, and
a sending device for transmitting the enhanced partial map and/or the image of the environment to the database for enhancing the digital map.

The receiving device and the sending device can be provided as joint communication device. The sensor arrangement comprises in particular a Lidar sensor, a radar sensor, or an ultrasonic sensor.

Figure 2:
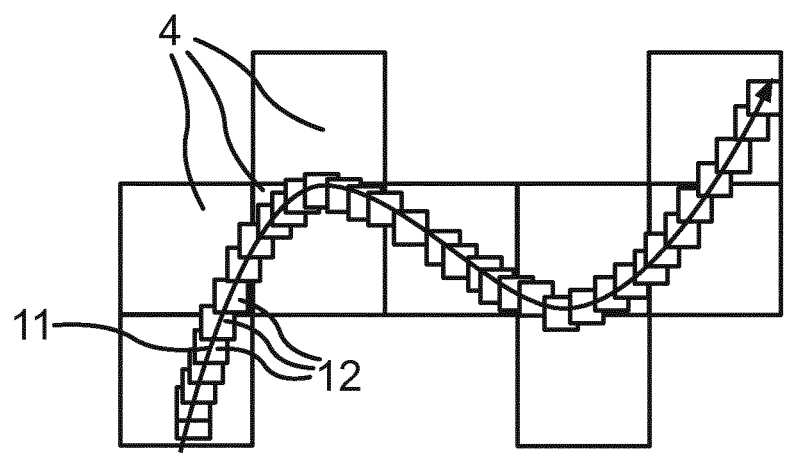
Figure 3:
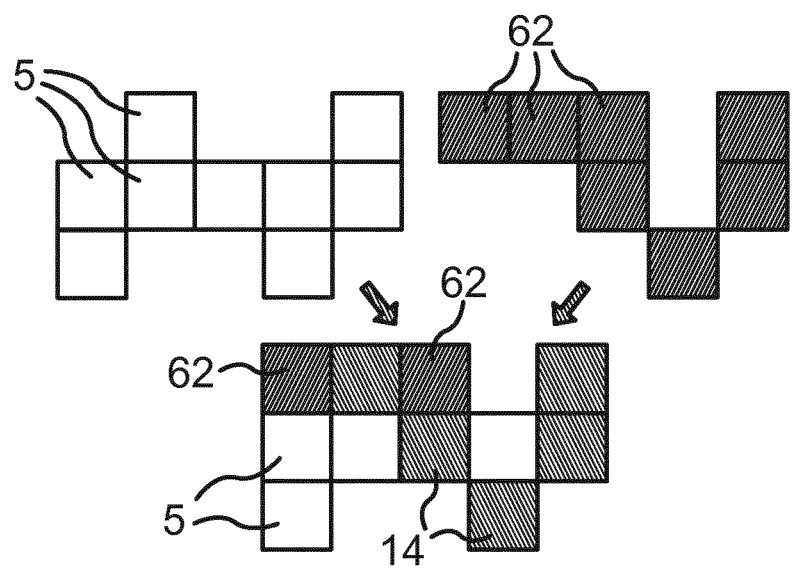
Figures 4A, 4B:
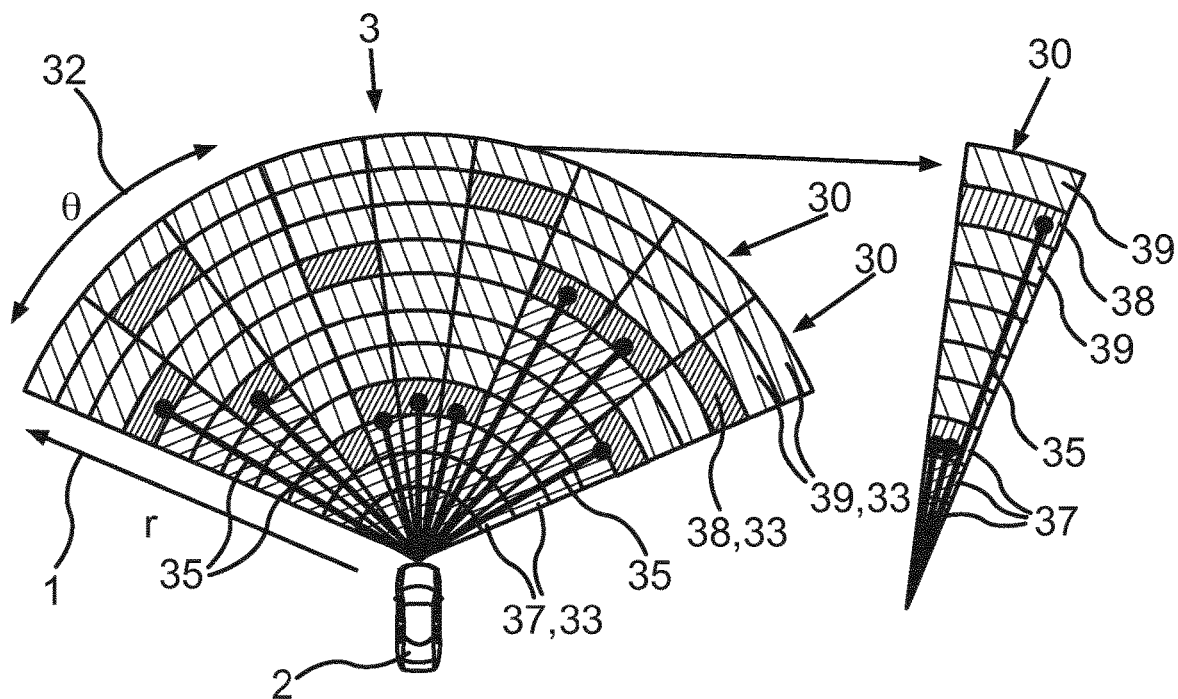
Figure 5:
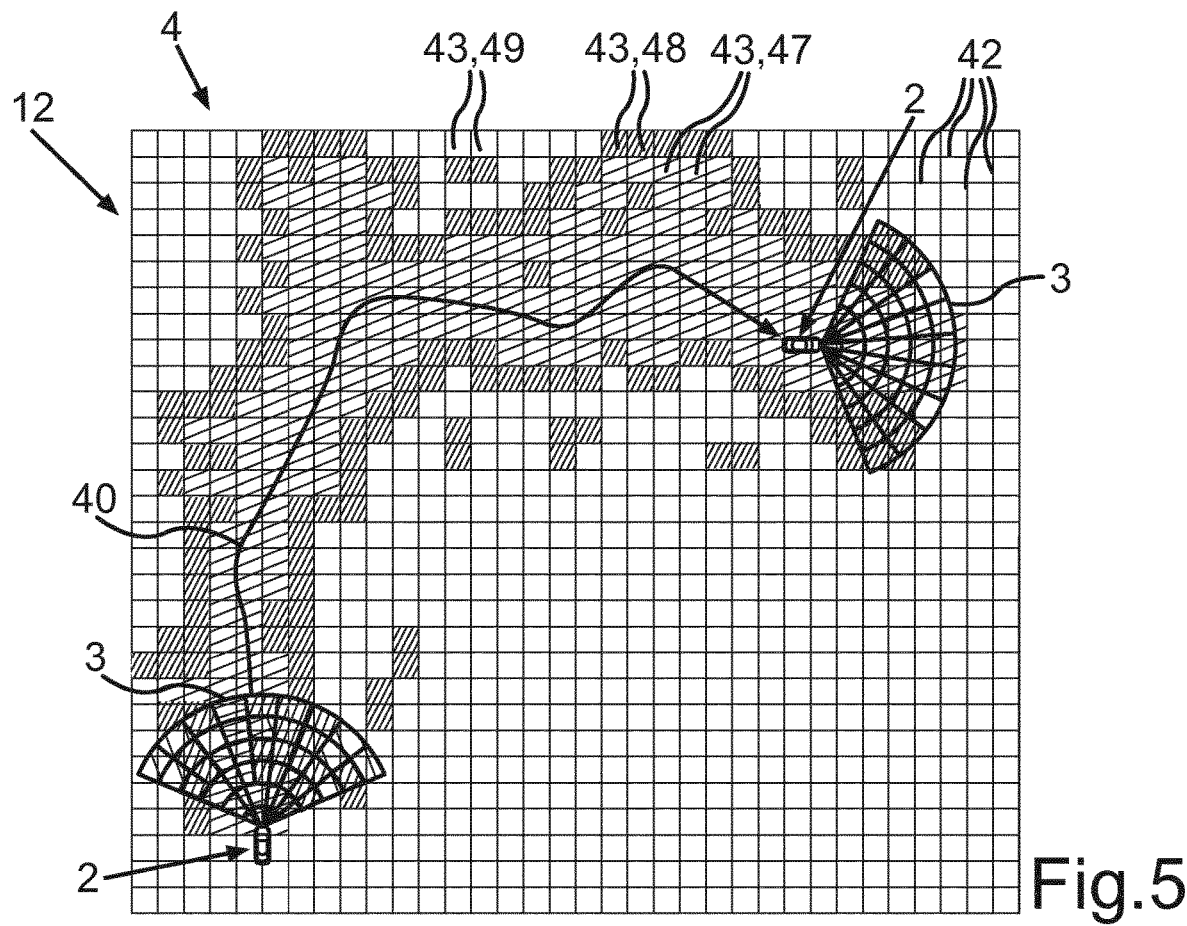

The attached drawings show:

FIG. 1 an example of the segmentation of the digital map into the multitude of the digital partial maps;

FIG. 2 an exemplary trajectory of a motor vehicle through environmental regions, which are represented by various digital partial maps;

FIG. 3 an example for the enhancing of the digital map on the basis of enhanced digital partial maps from several motor vehicles;

FIGS. 4a and 4b images of an environment of a motor vehicle from a sensor arrangement;

FIG. 5 a digital partial map as well as an image of the environment; and

Figure 6:
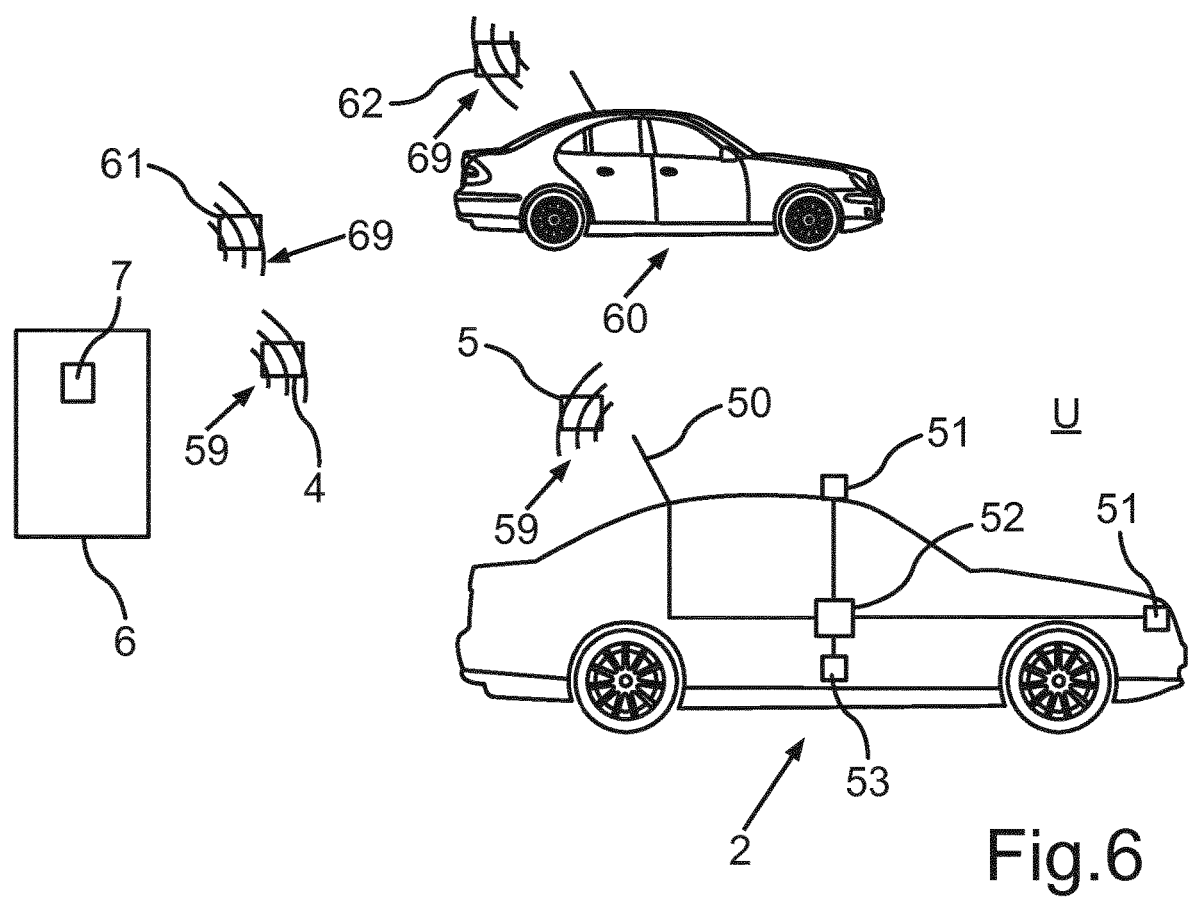

FIG. 6 a motor vehicle with a localization device as well as a server device with a database.

FIG. 6 shows a motor vehicle 2 with a localization device 54 as well as a server device 6. The server device 6 comprises a database 7, in which a digital map 1 is stored. By the server device 6 the digital map 1 is segmented according to a predetermined segmentation rule into a multitude of digital partial maps 4. A digital partial map 4 from the multitude of digital partial maps is sent by means of a radio link 59 to the motor vehicle 2. By a communication device 50 of the motor vehicle 2 the digital partial map 4 is received from the database 7. The communication device 50 comprises a receiving device and a sending device. For instance the communication device 50 is configured as radio module for communication via the mobile radio network. In this case the radio link 59 can be established via the mobile radio network. Thus, the digital partial map 4 can be received via the mobile radio network from the database 7. For instance the motor vehicle 2 comprises a storage device 53 for caching of the digital partial map 4.

The motor vehicle 2 moreover comprises a sensor arrangement 51 for capturing an image 3 of an environment U of the motor vehicle 2. Preferably, the sensors of the sensor arrangement 51 are TOF sensors, which determine the image 3 of the environment through evaluation of a time of flight of a measuring signal. The sensor arrangement 51 for instance comprises an ultrasonic sensor, a radar sensor, and/or a Lidar sensor.

FIG. 1 shows an example of the predetermined segmentation rule, according to which the digital map 1 can be segmented into the multitude of digital partial maps 4. The digital map 1 in the present case represents the entire surface of the earth. In a first level 25 of the segmentation rule the digital map 1 is segmented into four segmental parts. The four segmental parts of the first level 25 in turn each are segmented into four segmental parts of a second level 26 of the segmentation rule. This is shown by reference to a segmental part 20 of the first level 25 of the segmentation rule in FIG. 1. The segmental part 20 is segmented in the second level 26 into four segmental parts 21. The segmental parts 21 in turn are segmented in a third level 27 of the segmentation rule each into four segmental parts 22. In other words, the digital map 1 is segmented cascaded. Cascaded in this context means in particular that segmental parts 20, 21, 22 are segmented consecutively in the same way. The segmental parts of a last level of the segmentation rule can form a multitude of the digital partial maps 4, which are sent to the motor vehicle 2. For instance the multitude of digital partial maps 4 are formed by segmental parts of a sixteenth level of the segmentation rule.

The predetermined segmentation rule of the embodiment shown in the above is also referred to as quadtree tile system (also in German). By way of segmenting the digital map 1 into the multitude of digital partial maps 4 an approximation error during transferring the globe-related spherical coordinates into (with respect to the earth's surface) Cartesian coordinates, in particular two-dimensional Cartesian coordinates can be reduced to a minimum. The smaller the respective environmental region represented by the digital partial maps 4, the smaller the approximation error. In particular the earth's surface is approximated by the multitude of digital partial maps 4 each by means of a plane.

According to FIG. 2 the motor vehicle 2 moves along a trajectory 11. In this connection the motor vehicle 2 traverses various environmental regions, which are represented by different ones of the digital partial maps 4. In particular the motor vehicle 2 receives the digital partial map before or whilst the motor vehicle 2 reaches the respective environmental region represented by the digital partial map 4. In other words the motor vehicle 2 prior to or upon entry into an environmental region receives the respective digital partial map 4, which represents the environmental region. Whilst driving along the trajectory 11 several images 12 of the environment U of the motor vehicle 2 are captured. This is represented in FIG. 2 extremely schematically. For instance images 12 of the environment U each are captured at a predetermined distance from each other. For instance in the movement of the motor vehicle 2 along the trajectory 11 every 0.1 m, 0.5 m, 1 m, 2 m, 5 m, or 10 m one of the images 12 is captured.

FIG. 4 shows in an exemplary way an image 3 of the environment U of the motor vehicle 2. The image 3 in the radial direction 31 and azimuthal direction 32 is segmented into several cells 33. For instance each of the cells 33 has a respective predetermined extension in the radial direction 31 and in the azimuthal direction 32. For instance the cells 33 are segmented into several angle areas 30. The cells 33 are classified as vacant cells 37, occupied cells 39, and ambiguous cells 38. As vacant cells 37 such of the cells 33 are classified, for which in the image 3 no obstacle is identified. Areas of the environment U, which are represented by one of the vacant cells 37, can be identified as drivable. As occupied cells 39 such of the cells 33 are classified, for which in the image 3 an obstacle is identified. Areas of the environment U, which are represented by one of the occupied cells 39, can be identified as non-drivable. Those of the cells 33, for which in the image 3 no obstacle is identified, for which, however, the existence of an obstacle cannot be ruled out, are regarded as ambiguous cells 38. For instance the ambiguous cells 38 cells 38 represent areas of the environment U, which are at least partly covered by an obstacle. In other words the ambiguous cells 38 represent areas of the environment U, in which on the one hand no obstacle is identified. On the other hand, however, a cell 33 has been identified radially internally as occupied cell 39. Therefore it cannot be ruled out that the ambiguous cells 38 represents an area of the environment U, which includes an obstacle that is covered by an obstacle that is situated closer.

Additionally each of the cells 33 can be characterized by a probability indication, which indicates how likely the classification of a respective cell 33 is to be correct. By the probability indication alternatively or additionally a probability of an occupancy of the cell 33 can be characterized. For instance the probability of the vacant cell 37 indicates how likely the vacant cell 37 is to be actually vacant. Alternatively, the probability of the vacant cell 37 can indicate how likely the vacant cell 37 is occupied. For instance a cell 33 is regarded as vacant cell 37 if the probability of an occupancy by an obstacle remains below a predetermined first threshold value. For instance the probability of one of the occupied cells 39 indicates how likely the occupied cell 39 is to be actually occupied. Alternatively or additionally, the probability of the occupied cell 39 can indicate how likely the occupied cell 39 is to be occupied. In this case a cell 33 can be regarded as occupied cell 39, if the probability of an occupancy through an obstacle exceeds a predetermined second threshold value.

The probability indication of cells 33 of the image 3 can for instance be created from a signal quality of the sensor arrangement 51 or from a capture precision of the sensor arrangement 51. Moreover, the probability indication can consider if measurement errors occur or contradictory measurement values are captured.

Due to the principle, in particular in the case of a TOF sensor of the sensor device 51, it may be envisaged that the sensor arrangement 51 captures the image 3 of the environment U by measuring distances 35 of obstacles. This corresponds in particular to the functional principle of a TOF sensor. Thus, the position of obstacles can be determined by analyzing the distances 35 of the obstacles. In dependence on the position of the obstacles those of the cells 33, to which an obstacle can be assigned, can be identified as occupied cells 39. For instance a cell 33 is regarded as occupied if from the area that is represented by the cell 33 an echo from a potential obstacle is captured.

FIG. 5 shows a digital partial map 4, which the motor vehicle 2 for example receives from the database 7. Within the environmental region represented by the digital partial map 4 the motor vehicle 2 moves along a trajectory 40. The digital partial map 4 is characterized by a grid 42 as well as a respective occupancy indication as to grid cells 43 of the grid 42. The grid cells 43 in the present case form standard cells of a two-dimensional space, which is represented by the digital partial map 4. On the basis of the grid cells 43 the so-called "evidential occupancy grip map (EOGM)" is determined. Thus, to each of the grid cells 43 an occupancy indication is assigned.

The motor vehicle 2 performs a so-called method for "Simultaneous Localization and Mapping (SLAM)" on the basis of the digital partial map 4. For this purpose the motor vehicle 2 comprises a computing device 52. In this connection the motor vehicle 2 is localized and simultaneously the digital partial map 4 enhanced. By comparing the image 3 of the environment U as well as the digital partial map 4 the pose, i.e. the position and orientation of the motor vehicle 2 is determined. For instance the pose is determined by way of comparing the occupancy indications of the cells 33 of the image 3 as well as the grid cells 43 of the digital partial map 4. For instance it is determined for which pose of the image 3 in the digital partial map 4 differences among the image 3 and the digital partial map 4 are minimized. From the pose of the image 3 then the pose of the motor vehicle 2 in the environmental region or environment U can be determined. The pose of the motor vehicle 2 can be determined by the computing device 52.

The grid cells 43 are regarded either as vacant grid cells 47, occupied grid cells 49, or ambiguous cells 48. This classification is effected in particular in analogy to the cells 33 of the image 3 of the environment U. For instance the vacant grid cells 47 represent such areas of the environmental region, for which it is recognized that no obstacle is situated therein. For instance the occupied grid cells 49 represent such areas of the environmental region, in which an obstacle is recognized. For instance the occupied grid cells 49 represent such areas of the environmental region, in which an obstacle is identified. For instance the ambiguous cells 48 represent such areas of the environmental region, for which it is not possible to make a statement.

The grid cells 43 each can be characterized additionally by a probability indication. By the probability indication a probability of an occupancy of the respective grid cell 43 can be characterized. Alternatively or additionally, the probability indication can indicate how likely the occupancy indication of one of the grid cells 43 is to be correct. The probability indication can for instance consider at what time an occupancy indication was captured, with what measuring accuracy an occupancy indication was captured, and how confidential a source is, from which the occupancy indication was captured.

The occupancy indications of the grid cells 43 of the received digital partial map 4 can be enhanced in consideration of both the received digital partial map 4 as well as the image 3. The received digital partial map 4 in consideration of the image 3 can be enhanced into an enhanced digital partial map 5. The enhanced digital partial map 5 in this connection represents the same environmental region as the received digital partial map 4. In particular when enhancing the received digital partial map 4 the occupancy indications of the grid cells 43 are enhanced. In particular the enhanced digital partial map 5 can be created from the received digital partial map 4 as well as the image 3 of the environment U. The received digital partial map 4 can be enhanced by the computing device 52.

For instance for each of the grid cells 43 an enhanced occupancy indication is created from the occupancy indication of the received digital partial map 4 and the occupancy indications of the cells 33 of the image 3. If the occupancy indications of the cells 33 of the image 3 and the grid cells 43 of the received digital partial map 4 differ, the enhanced occupancy indication can be created in consideration of the probability indications of the respective occupancy indications. For instance an area of the environment U in the received digital partial map 4 is determined as vacant and in the image 3 is determined as occupied. In this case on the basis of the probability indications it can be determined, which of the two indications, vacant or occupied, is more credible or more likely. In particular the more credible occupancy indication is incorporated into the enhanced digital partial map 5. For instance the occupancy indication of the cells 33 of the image 3 can be determined as more credible if the capturing of the occupancy indication of the digital partial map 4 is longer than a certain predetermined period of time. For instance the occupancy indication from the received digital partial map 4 can be determined as more credible if the measuring accuracy and/or the signal quality of the sensor arrangement 51 remains below a certain predetermined measure.

As described in the above, the communication device 50 comprises a sending device. By means of the sending device the enhanced digital partial map 5 is transmitted to the database 7 or the server device 6. For instance the enhanced digital partial map 5 is transmitted via the radio link 59 to the server device 6. The server device 6 can receive the enhanced digital partial map 5 and store it in the database 7.

FIG. 6 moreover shows a further motor vehicle 60, which performs an identical method as the motor vehicle 2. In particular also by the further motor vehicle 60 a digital partial map 61 is received. For instance the server device 6 transmits the enhanced digital partial map 5 as the digital partial map 61 to the further motor vehicle 60 after same was received from the motor vehicle 2. In particular the server device 6 transmits the enhanced digital partial map 5 prior to or during an entry of the further motor vehicle 60 into the environmental region represented by the enhanced digital partial map 5. In this case for the further motor vehicle 60 an improved localization through the enhanced digital partial map 5 in comparison with the digital partial map 4 is facilitated. The localization on the basis of the enhanced digital partial map 5 can be improved since the enhanced digital partial map 5 owing to the enhancement through the motor vehicle 2 is more precise and/or more current than the digital partial map 4.

Also the further motor vehicle 60 performs a SLAM method. Thus, the further motor vehicle 60 is localized on the basis of the digital partial map 61, whilst simultaneously the digital partial map 61 is enhanced. The enhancement of the digital partial map 61 into an enhanced partial map 62 can be effected in analogy to the enhancement of the digital partial map 4 into the enhanced digital partial map 5. For this reason the individual steps here are not described again.

The server device 6 can receive both the enhanced digital partial map 62 from the further motor vehicle 60 as well as the enhanced digital partial map 5 from the motor vehicle 2. In particular can the server device 6 receive a multitude of enhanced digital partial maps 5 from the motor vehicle 2, for instance one after the other. The enhanced partial maps 5 of the multitude of enhanced partial maps 5 from the motor vehicle 2 each can represent respectively different environmental regions. According to FIG. 2, as described in the above, a multitude of digital partial maps 4 is received by the motor vehicle 2 from the database 7. The multitude of digital partial maps 4 each represent an environmental region along the trajectory 11. For instance each of the digital partial maps 4 is enhanced according to FIG. 2 through the motor vehicle 2. In this case the database 7 can receive for each of the digital partial maps 4 according to FIG. 2 an enhanced digital partial map 5. In analogy this applies to the enhanced digital partial maps 62, which receives the database 7 from the further motor vehicle 60.

FIG. 3 now shows in an exemplary way enhanced digital partial maps 5, which the database 7 has received from the motor vehicle 2, as well as enhanced digital partial maps 62, which the database 7 has received from the further motor vehicle 60. The enhanced digital partial maps 5 according to FIG. 3 can be created on the bases of the digital partial maps 4 according to FIG. 2.

According to FIG. 3 several environmental regions are represented only by enhanced digital partial maps 5 from the motor vehicle 2. Other environmental regions are only represented by enhanced digital partial maps 62 from the further motor vehicle 60. The digital partial map 1 can for instance be enhanced by composing the enhanced digital partial maps 62 and the enhanced digital partial maps 5.

Several environmental regions are represented both by enhanced digital partial maps 5 from the motor vehicle 2 as well as by enhanced digital partial maps 62 from the further motor vehicle 60. For these environmental regions by the server device 6 respective further enhanced digital partial maps 14 can be created. These further enhanced digital partial maps 14 can be created from the enhanced partial maps 5 and the enhanced digital partial maps 62. In particular enhanced digital partial maps 5 and enhanced digital partial maps 62, which represent the same environmental region, are composed into one of the digital partial maps 14. The creating of the digital partial maps 14 can be effected in analogy to the creating of the enhanced digital partial map 5 from the image 3 and the digital partial map 4.

For instance respective occupancy indications of one of the digital partial maps 14 are created from the respective occupancy indications of the enhanced digital partial map 5 and the enhanced partial map 62 for the respective environmental region. The creating of the occupancy indications of the digital partial map 14 can be effected on the basis of the probability indications for the respective occupancy indications of the enhanced digital partial maps 5 and 62. For instance the occupancy indication of the digital partial map 14 is formed from the occupancy indication from that enhanced digital partial map 5 or 62, which is more likely to be correct. In particular the creating of the digital partial map 14 is effected from the enhanced partial maps 5 and 62 on the basis of the evidence theory, in particular the Dempster-Shafer theory. On the basis of the evidence theory the probability indications for the occupancy indications of the digital partial maps 5 and 62 can be combined particularly advantageously into occupancy indications of the digital partial map 14.

By the predetermined segmentation rule described in FIG. 1, which is valid for the motor vehicle 2, the further motor vehicle 60, as well as equally for any number of further motor vehicles, it is ensured that the digital partial maps, which are transmitted by different motor vehicles, match with regard to their spatial expansion. In particular the position and the orientation of the multitude of the digital partial maps is the same for all motor vehicles 2, 60. In the same way the digital partial maps, which are received from different motor vehicles 2, 60, can be combined by the database 7 particularly advantageously. In particular by the predetermined segmentation rule a grid is provided, which is stationary with regard to the earth and according to which the digital map 1 is segmented into the multitude of digital partial maps 4.

The digital map 1 is enhanced in two regards: On the one hand, by enhancing the digital partial map 4 on the basis of the image 3 of the environment U. The enhanced digital partial map 5 is in particular adopted as partial map in the digital map 1. On the other hand, by creating the further enhanced digital partial map 14 from the different enhanced digital partial maps 5, 62 from the different motor vehicles 2, 60. The further enhanced digital partial map 14 is in particular adopted as partial map 1.

By applying the evidence theory or using an "evidential occupancy grip map (EOGM)" a robust description of the occupancy indications in consideration of probability indications is rendered. Hereby a particularly advantageous composing of further enhanced digital partial maps 14 from the enhanced digital partial maps 5, 62 from different motor vehicles 2, 60 is facilitated.

The invention claimed is:

1. A method for localizing and enhancing a digital map through a motor vehicle, the method comprising:
   receiving a digital partial map of a multitude of partial maps of the digital map through the motor vehicle from a database,
   wherein the digital map according to a predetermined segmentation rule is segmented into the multitude of the digital partial maps,
   wherein the digital partial map according to the predetermined segmentation rule is segmented by cascaded segmenting of the digital map into four segmental parts of equal size, and
   wherein the digital partial map represents an environment of the motor vehicle;
   capturing an image of the environment of the motor vehicle by a sensor arrangement of the motor vehicle;
   localizing of the motor vehicle in the environment by comparing the received digital partial map with the image of the environment of the motor vehicle;
   enhancing the digital partial map on a basis of the image of the environment of the motor vehicle; and
   transmitting the enhanced digital partial map and/or the image of the environment to a database for enhancing the digital map,
   wherein each cell of the digital partial map is characterized with an occupancy indication and an additional probability indication which indicates a probability of a correct classification of the occupancy indication,
   wherein during enhancing the digital partial map an enhanced occupancy indication is created from an occupancy indication determined on the basis of the image of the environment as well as on the basis of at least one further occupancy indication, which was received as part of the digital partial map,
   wherein the occupancy indication is classified as vacant, occupied, and ambiguous, and
   wherein when a probability of an occupancy through an obstacle exceeds a predetermined threshold value, the occupancy indication is classified as occupied.

2. The method according to claim 1, wherein the localizing is performed on the basis of the digital partial map as well as the enhancing of the digital partial map simultaneously through a method for simultaneous localization and mapping (SLAM).

3. The method according to claim 1, wherein an area of validity of the digital partial map within a predetermined stationary coordinate system is fixed.

4. The method according to claim 1, wherein the digital partial map at least partly is characterized by a grid as well as the occupancy indication respectively relating to grid cells of the grid.

5. The method according to claim 4, wherein the enhanced occupancy indication is created in consideration of a more credible probability indication of the respective occupancy indications in the received digital partial map and in the image of the environment.

6. The method according to claim 1, wherein the enhancing of the digital partial map is effected on the basis of the Dempster-Shafer theory.

7. The method according to claim 1, wherein the digital partial map is received prior to or upon entry of the motor vehicle into an environmental area represented by the digital partial map and/or is transmitted upon leaving the environmental area represented by the digital partial map through the motor vehicle.

8. The method according to claim 1, wherein upon capturing the image of the environment of the motor vehicle by the sensor arrangement, distance values for obstacles are measured by the sensor arrangement.

9. The method according to claim 1, wherein the digital partial map is received from the database of a server device and/or the enhanced digital partial map is transmitted to the database of the server device.

10. The method according to claim 9, wherein by the server device in addition to the enhanced digital partial map from the motor vehicle a further enhanced digital partial map from a further motor vehicle is received and the digital map is enhanced by composing the two enhanced digital partial maps.

11. The method according to claim 10, wherein the composing of the two enhanced digital partial maps is effected on the basis of the Dempster-Shafer theory.

12. A motor vehicle localization device, comprising:
- a receiver for receiving a digital partial map of a multitude of partial maps of a digital map through the motor vehicle from a database,
  wherein the digital map according to a predetermined segmentation rule is segmented into the multitude of the digital partial maps,
  wherein the digital partial map according to the predetermined segmentation rule is segmented by cascaded segmenting of the digital map into four segmental parts of equal size, and
  wherein the digital partial map represents an environment of the motor vehicle;
- a sensor arrangement for capturing an image of the environment of the motor vehicle,
- a computer for localizing the motor vehicle in the environment by comparing the received digital partial map with the image of the environment of the motor vehicle as well as enhancing the digital map on a basis of the image of the environment of the motor vehicle; and
- a transmitter for transmitting the enhanced digital partial map and/or the image of the environment to the database for enhancing the digital map,
  wherein each cell of the digital partial map is characterized with an occupancy indication and an additional probability indication which indicates a probability of a correct classification of the occupancy indication,
  wherein during enhancing the digital partial map an enhanced occupancy indication is created from an occupancy indication determined on the basis of the image of the environment as well as on the basis of at least one further occupancy indication, which was received as part of the digital partial map,
  wherein the occupancy indication is classified as vacant, occupied, and ambiguous, and
  wherein when a probability of an occupancy through an obstacle exceeds a predetermined threshold value, the occupancy indication is classified as occupied.

* * * * *